(12) United States Patent
Singh et al.

(10) Patent No.: US 8,543,856 B2
(45) Date of Patent: Sep. 24, 2013

(54) SEMICONDUCTOR DEVICE WITH WAKE-UP UNIT

(75) Inventors: Shubhra Singh, Noida (IN); Kumar Abhishek, Ghaziabad (IN); Mukesh Bansal, Cheeka (IN)

(73) Assignee: Freescale Semiconductor Inc, Austin, TX (US)

( * ) Notice: Subject to any disclaimer, the term of this patent is extended or adjusted under 35 U.S.C. 154(b) by 39 days.

(21) Appl. No.: 13/214,164

(22) Filed: Aug. 20, 2011

(65) Prior Publication Data

US 2013/0047016 A1    Feb. 21, 2013

(51) Int. Cl.
 *G06F 1/00* (2006.01)
 *G06F 1/26* (2006.01)

(52) U.S. Cl.
 USPC .......................... 713/323; 713/320; 713/324

(58) Field of Classification Search
 None
 See application file for complete search history.

(56) References Cited

U.S. PATENT DOCUMENTS

| | | | |
|---|---|---|---|
| 5,404,089 A * | 4/1995 | Flanagan et al. | 318/811 |
| 6,760,850 B1 * | 7/2004 | Atkinson et al. | 713/320 |
| 6,886,105 B2 | 4/2005 | Kahn | |
| 7,583,104 B2 | 9/2009 | Simmons | |
| 7,593,455 B2 | 9/2009 | Son | |
| 7,864,051 B2 | 1/2011 | Paradiso et al. | |
| 8,001,406 B2 | 8/2011 | Choi | |
| 2006/0101298 A1 | 5/2006 | Park | |
| 2008/0108318 A1 | 5/2008 | Min | |
| 2008/0162969 A1 | 7/2008 | Royannez | |
| 2010/0064160 A1 | 3/2010 | Wilson | |
| 2010/0205467 A1 | 8/2010 | Park | |
| 2011/0006824 A1 | 1/2011 | Kang | |
| 2011/0158303 A1 | 6/2011 | Gauthier | |
| 2011/0185199 A1 | 7/2011 | Hung | |

* cited by examiner

*Primary Examiner* — Kim Huynh
*Assistant Examiner* — Vincent Chang
(74) *Attorney, Agent, or Firm* — Charles Bergere

(57) ABSTRACT

A semiconductor device having a low power mode includes a buffer circuit associated with an interface pad, a power management controller (PMC), and a wakeup unit for waking up a part of the device from the low power mode. The buffer circuit is disabled in the low power mode by asserting a power on reset (POR) signal associated with the PMC. A wakeup signal is generated and provided to the wakeup unit from an analog power supply associated with the buffer circuit.

2 Claims, 4 Drawing Sheets

| GROUP | WAKEUP PADS | PACKAGE TYPE | | | GATED WITH |
|---|---|---|---|---|---|
| | | 176 | 208 | 324 | |
| G0 | PJ6, PJ4, PB1, PB10, PF2, PB12, PB9, PB4, PC10, PC0, PB3, PF0, PF3, PF8 | Y | Y | Y | NOT GATED |
| G1 | PM10 (GPIO[157]) | Y | X | X | SIG1 |
| G2 | PM3, PL9, PK7, PL0, PL2 | X | Y | Y | SIG2 |
| G3 | PN0, PN2, PN10, PO2 | X | X | Y | SIG3 |

TABLE 1

FIG. 5

SEMICONDUCTOR DEVICE WITH WAKE-UP UNIT

BACKGROUND OF THE INVENTION

The present invention relates to semiconductor devices and more particularly, to a low power wake-up architecture for system on a chip (SOC) semiconductor devices including SOC circuitry designed for use with multiple package types and packages employing various pin counts.

Microcontroller units (MCUs) such as those used in SOCs typically have a low power mode including power gating for a major part of a core of the SOC. To exit from the low power mode, typically an external wakeup source provides a wake-up signal to the SOC through input/output (I/O) pads of the SOC. The I/O pads include I/O buffers for driving loads and/or to provide isolation against external shocks such as electrostatic discharge (ESD).

FIG. 1 shows a conventional buffer circuit 10 associated with an I/O pad (not shown) that has an input buffer 11 that receives an input signal from the I/O pad and generates a wakeup path signal (Ipp_ind). An input signal (Ipp_do) to the buffer circuit 10 is routed through an output buffer or driver 12. The buffer circuit 10 also receives a power on reset (POR) signal. However, this POR signal is separate from a general POR signal and this separate POR signal is provided to the buffer circuits connected to chip wakeup circuitry. This separate POR signal is inactive in low power mode.

The output buffer 12 may be disabled in low power mode, but input buffer 11 remains enabled by keeping the core supply to the input buffer 11 active to enable the wakeup path, which is shown as "core supply ON" input to the buffer circuit 10. In order to function, an IO supply to the buffer circuit 10 also is ON, shown as "IO supply ON". However, keeping the input buffer 11 active adds significant power overhead that can use an extra 5-10 μA of current in a large circuit.

The requirement to provide the core supply to input buffers while in low power mode also presents a physical design overhead since an always ON power supply must be routed to selected pads/buffers. To minimize risk of shorting and avoid current leakage the layout and design of power supplies for pads/buffers should be separated from power supplies that may be OFF in low power mode. However this requirement increases complexity of the pad ring since a separate supply rail is needed to supply these pads/buffers. Customized glue logic may also be required for different pad ring components. Further, such custom logic requirements may not be available for circuits designed using a generic I/O library.

Therefore, it would be desirable to have a low power architecture for a semiconductor device that does not need to maintain I/O pads in an always ON state. It further would be desirable to be able to remove the requirement of providing a core power supply to the I/O pads.

BRIEF DESCRIPTION OF THE DRAWINGS

The following detailed description of a preferred embodiment will be better understood when read in conjunction with the appended drawings. The present invention is illustrated by way of example and is not limited by the accompanying figures in which like references indicate similar elements. It is to be understood that the drawings are not to scale and have been simplified for ease of understanding the invention.

FIG. 5 is a table showing the decode logic for wakeup gating signals associated with the wakeup architecture of FIG. 4.

DETAILED DESCRIPTION OF THE INVENTION

According to one aspect, the present invention provides a semiconductor device having a low power mode and including at least one interface pad, a power management controller (PMC) and a wakeup unit for waking up at least a part of said device from said low power mode, wherein pads are disabled in said low power mode by asserting a power on rest (POR) signal associated with said PMC and wherein a wakeup path is provided to said wakeup unit from an analog power supply associated with said at least one interface pad. The semiconductor device may comprise a system on a chip (SOC) device.

The wakeup signal may be applied to the wakeup unit via a high to low level shifter. The wakeup signal may be gated via a gating signal indicative of package associated data. The gating signal may be obtained from flash memory adapted to store package data associated with the semiconductor device.

The wakeup signal and the gating signal may be applied to respective inputs of a logical AND gate. The gating signal may be applied to the AND gate via a low to high level shifter. The output of the AND gate may be applied to the wakeup unit via a high to low level shifter.

According to another aspect of the present invention, there is provided a method of generating a wakeup signal to a wakeup unit associated with a semiconductor device, said semiconductor device having a low power mode and including at least one interface pad, a power management controller (PMC) and said wakeup unit. The method includes the steps of asserting a power on reset (POR) signal associated with said PMC and generating said wakeup signal from an analog power supply associated with said at least one interface PAD.

Figure 2:
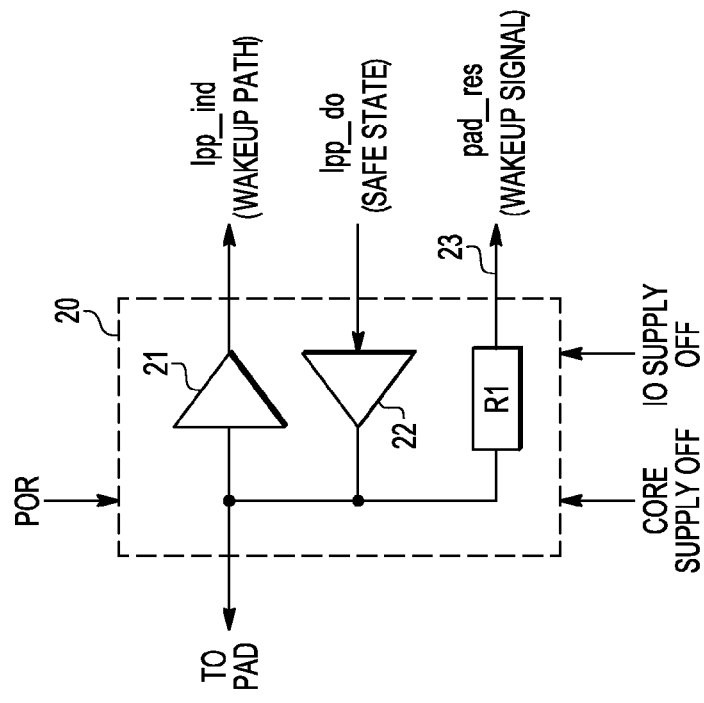
FIG. 2 is a schematic circuit diagram of an I/O pad buffer circuit with a wakeup path according to one embodiment of the present invention.
Figure 1:
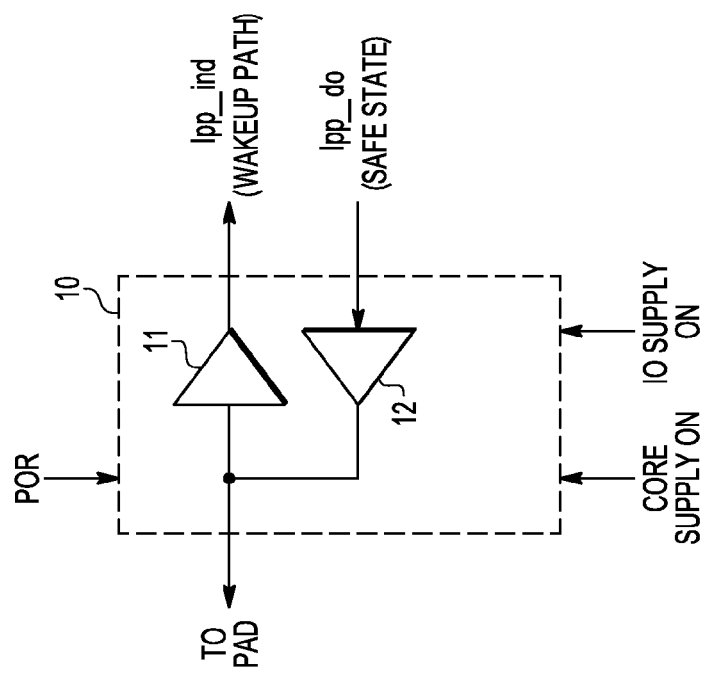
FIG. 1 is a schematic circuit diagram of a conventional I/O pad buffer circuit.

Referring to FIG. 2, a buffer circuit 20 associated with an I/O pad (not shown) in accordance with an embodiment of the invention is shown. Like the conventional buffer circuit 10, the buffer circuit 20 includes an input buffer 21 that receives an input signal from the pad and outputs a signal lpp_ind to a wakeup unit (not shown), and an output buffer 22 that receives an internal signal lpp_do and generates an output signal to the pad. Power to the buffer circuit 20 may be disabled by asserting the power on reset (POR) signal for the I/O PAD connected to the buffer circuit 20. When buffer circuit 20 is in the disabled or low power mode the core supply is OFF or floating. In the disabled or low power mode there is no need to gate control signals associated with the I/O PAD to be at a specific or safe stated level. This may reduce routing complexity of the associated Pad facilitating a reduction of gate count.

Since the core power supply of the buffer circuit 20 is OFF, an alternative signal is used to wakeup the system. The alternate signal may be obtained via a direct resistive path from the associated pad. In this embodiment of the present invention, a wakeup signal 23 (Pad_res) may be propagated via resistor R1 (e.g., 200 ohms). The voltage of the wakeup signal 23 (Pad_res) is comparable to the analog supply voltage at the I/O PAD (e.g., 3.3 to 5 volts), so preferably the wakeup signal 23 is shifted to core supply level voltage (e.g., 1.2 volts) before being applied to a wakeup unit. Thus, the POR signal used for the buffer circuit 20 may be the same POR signal that is used for all of the I/O pad buffer circuits, whereas for the conventional buffer circuit 10, a separate POR signal is needed for wakeup buffer circuits.

Figure 3:
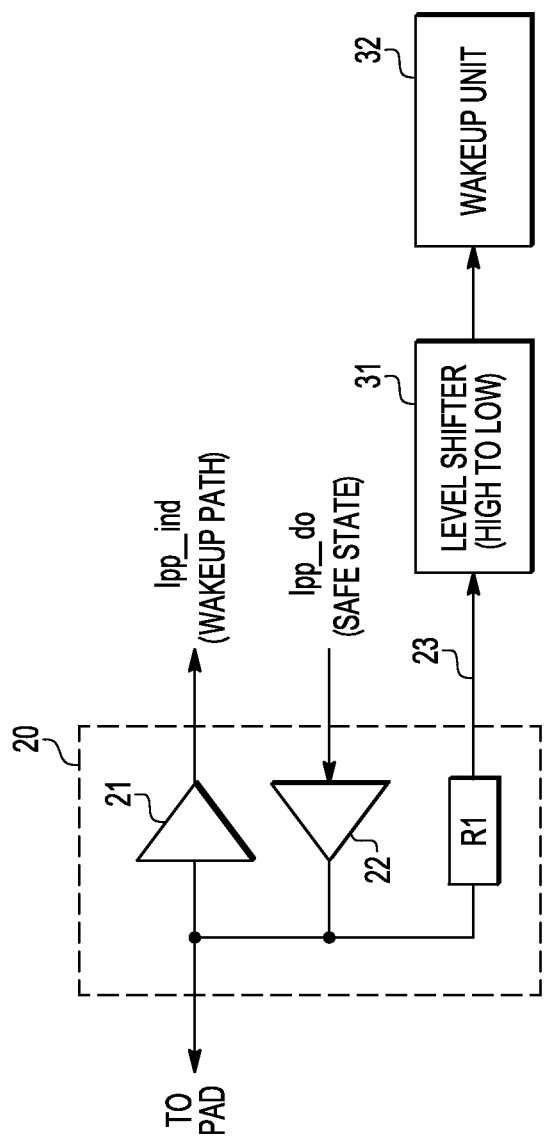
FIG. 3 is a schematic block diagram of a wake-up architecture in accordance with an embodiment of the present invention.

FIG. 3 shows a wakeup path for the buffer circuit 20, which includes a level shifter 31 and a wakeup unit 32. The wakeup signal 23 from the resistor R1 of the buffer circuit 20 is provided to the level shifter 31, which level shifts the wakeup signal 23. The level shifter 31 may be a DC level shifting circuit. The level shifting circuit 31 may include an op amp based DC shifting circuit or the like. The output of the level shifting circuit 31 is applied to the wakeup unit 32.

As discussed above, a single SOC device may be used in multiple packages including packages employing various pin counts. For example, in some packages many of the pads may be unbonded, (i.e., no bond wire connected to the pad) which may cause the corresponding wakeup lines to float. Unbonded pads may also increase functional current in an associated level shifter. To avoid current issues in the level shifter it is desirable to isolate wakeup signals to such unbonded pads.

Individual pads may be isolated by accessing device options inside a flash memory of an associated microcontroller unit (MCU) to access package associated information or data stored in the flash memory. This package data may be used to block certain functionality notwithstanding that such options are generally not accessible to end users. In one embodiment of the present invention, the package data is read from the flash memory, decoded, and used to isolate pad wakeup signals that are not being used in a specific package.

Figure 4:
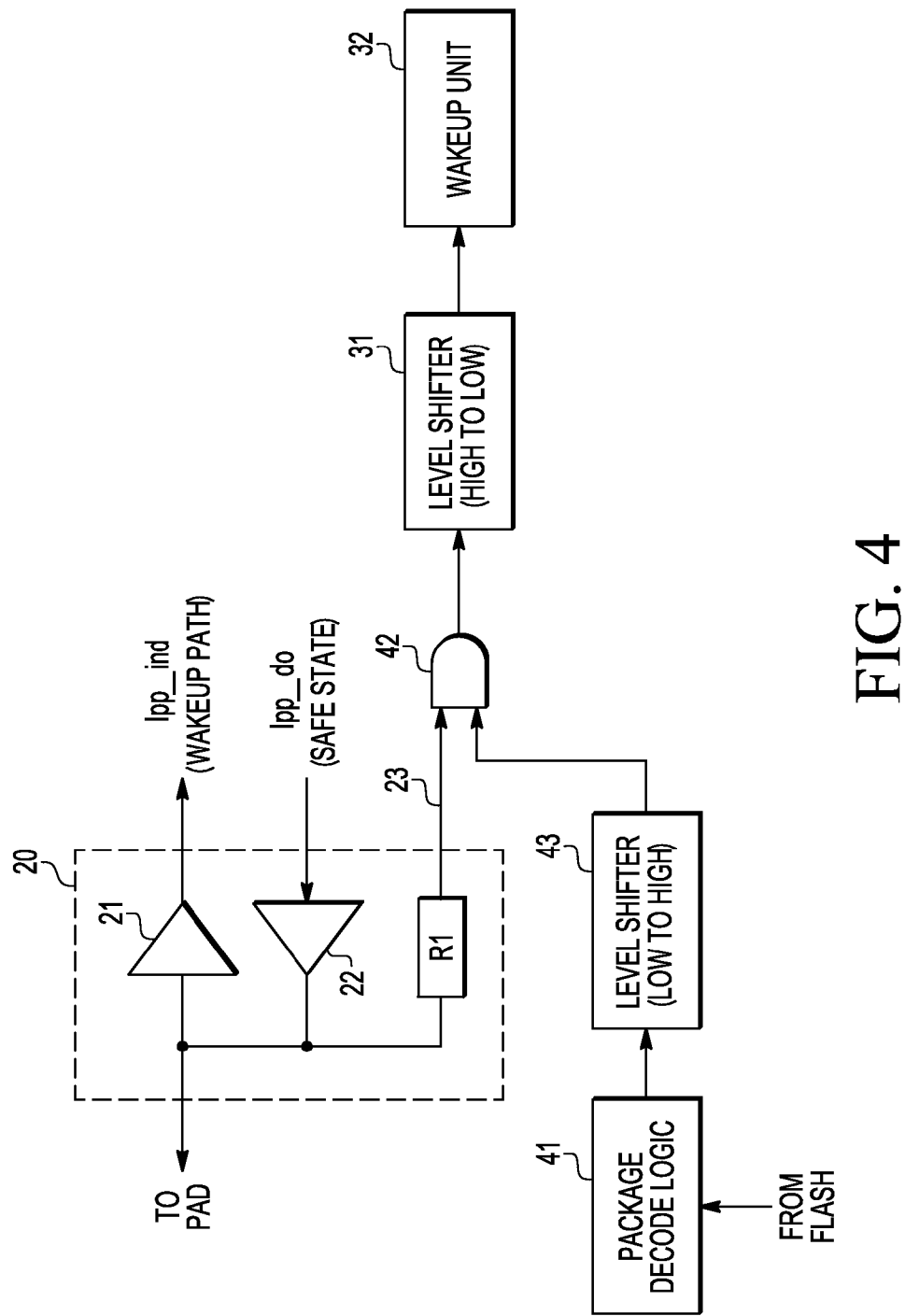
FIG. 4 is a schematic block diagram of a wakeup architecture for a multi-package device in accordance with an embodiment of the present invention.

FIG. 4 is a schematic block diagram of a low power architecture for a single die SOC device that may be assembled in multiple package types (e.g., package types 176, 208, 324 discussed with reference to FIG. 5 below). In the embodiment of FIG. 4, the buffer circuit 20 is connected to an unused or unbonded pad and has the wakeup signal 23 generated from the analog power supply associated with the pad.

In order to isolate the wakeup signal since it is associated with an unbonded pad, package information is read from the flash memory and provided to decode logic 41 and then is decoded and applied to an input of AND gate 42. The output of the AND gate 42 is used to gate the wakeup signal 23 that is provided to the wakeup unit 32. As previously discussed, the wakeup signal may be level shifted before being provided to the wakeup unit 32 such as with the level shifter 31. The decoded package information also may be level shifted (low to high) before being provided to the AND gate 42 with a level shifter 43.

To reduce current leakage, gating of the wakeup signal (Pad_res) 23 by the AND gate 32 is performed at an analog voltage level (3.3 v to 5 v) rather than core voltage level (1.2 v). Because the voltage obtained from the package decode logic 41 is at the lower core voltage level (e.g., 1.2 v), the decoded package information signal is shifted to a higher level via the low to high level shifter 43. The level shifter 43 may be configured in any suitable manner and by any suitable means. Similarly, because the gated wakeup signal at the output of AND gate 42 is at an analog voltage level (e.g., 3.3 v to 5 v), the gated wakeup signal needs to be shifted to a lower level (e.g., 1.2 v) via the high to low level shifter 31 before being applied to the wakeup unit 32.

FIG. 5 is a table including examples of wakeup gating signals Sig1, Sig2, Sig3 associated with package types 176, 208, and 324. The table shows that wakeup pads for package type 176 are gated with Sig1. Sig1 is logical "1" if the package type is 176 and is logical "0" if the package is not type 176. Sig1 is used to gate group "G1" pins (e.g., PM10) associated with a package type 176.

FIG. 5 also shows package types 208 and 324, which are gated with Sig2. Sig2 is logical "0" if the package type is 176 and is logical "1" otherwise (not Sig1). Sig2 is used to gate group "G2" pins (e.g., PM3, PL9, PK7, PL0, PL2) associated with package types 208, 324.

Table 1 further show that package type 324 is gated with Sig3. Sig3 is logical "1" if the package type is 324 and is logical "0" otherwise (not package type 324). Sig3 is used to gate group "G3" pins (e.g., PN0, PN2, PN10, PO2) associated with a package type 324.

The proposed wakeup approach eliminates a need to power up wakeup pads in low power mode. Because the approach uses a global POR signal from a PMC to disable I/O digital devices, a need to safe state I/O controls in lower power mode may be avoided. This saves gate circuit area and routing overhead.

The proposed wakeup scheme also works well with a multi-function and multi-purpose design because it does not require special wakeup functionality inside I/O drivers. Also unbonded (e.g., pads not connected to a lead of a lead frame) wakeup I/Os can be marked using package decode bit data to avoid short circuit currents due to floating input signals.

In a conventional wakeup implementation such features would require customized I/O design or SoC integration as well as software overhead for each package type in order to pull-up unbonded pads.

As is evident from the foregoing discussion, the present invention provides a low power wakeup architecture for a SoC semiconductor device. While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

The invention claimed is:

1. A semiconductor device having a plurality of I/O pads, wherein the semiconductor device is operable in a low power mode, the semiconductor device comprising:
   at least one interface pad;
   a buffer circuit connected to the interface pad, wherein the buffer circuit includes,
      an input buffer having an input terminal connected to the interface pad for receiving a signal input to the interface pad,
      an output buffer having an output terminal connected to the interface pad and the input terminal of the input buffer, for transmitting a signal to the interface pad, and
      a resistor having a first terminal connected to the interface pad, the input terminal of the input buffer, and the output terminal of the output buffer, and a second terminal for providing a wake-up signal;
   a power management controller (PMC) coupled to said I/O pads and said interface pad for supplying power thereto, wherein power to said I/O pads and said interface pad is disabled during said low power mode by assertion of a power on reset signal of said PMC;
   a first level shifter, connected to the second terminal of the resistor of the buffer circuit, for receiving the wake-up signal and shifting a voltage level of the wake-up signal from a analog supply high operation voltage level to a core operation voltage level; and a wake-up unit connected to the first level shifter for receiving the level-shifted wake-up signal, wherein the wake-up unit wakes up at least a part of said semiconductor device from said low power mode.

2. The semiconductor device of claim 1, further comprising:
- a memory for storing package personality data including I/O pad usage data;
- a second level shifter connected to the memory for shifting an output of the memory from a low voltage level to a high voltage level; and
- a logic gate connected between the first level shifter and the buffer circuit, wherein the logic gate has a first input terminal that receives the wake-up signal and a second input connected to the second level shifter for receiving the level shifted memory output, and an output terminal connected to an the input of the first level shifter.

* * * * *